United States Patent [19]

Havens et al.

[11] 3,816,330

[45] June 11, 1974

[54] METHOD OF PROTECTING COLLOIDAL SILICA AQUASOLS FROM BACTERIAL DEGRADATION

[75] Inventors: William D. Havens, Highland, Ind.; Sol Miller, Chicago, Ill.

[73] Assignee: E. I. du Pont de Nemours and Company, Wilmington, Del.

[22] Filed: Aug. 23, 1972

[21] Appl. No.: 282,875

Related U.S. Application Data

[63] Continuation-in-part of Ser. No. 78,183, Oct. 5, 1970, abandoned.

[52] U.S. Cl. .......................... 252/313 S, 106/287 S
[51] Int. Cl. ...................... B01j 13/00, C01b 33/14
[58] Field of Search .............. 252/313 S; 106/287 S

[56] References Cited
UNITED STATES PATENTS

| 2,250,480 | 7/1941 | Gump | 424/347 X |
| 2,799,658 | 7/1957 | Nickerson | 252/313 S |
| 2,823,186 | 2/1958 | Nickerson | 252/313 S |
| 3,148,110 | 9/1964 | McGahen | 252/313 S |

*Primary Examiner*—Richard D. Lovering

[57] ABSTRACT

Colloidal silica aquasols containing about 10–1000 parts per million of hexachlorophene are protected from contamination by microorganisms which cause undesirable changes in physical properties. The hexachlorophene is incorporated with agitation into colloidal silica sols as a solution in an aqueous alkali. This treatment prevents discoloration, bad odor, and slime formation and increases the shelf life of colloidal silica sols to more than one year.

7 Claims, No Drawings

METHOD OF PROTECTING COLLOIDAL SILICA AQUASOLS FROM BACTERIAL DEGRADATION

CROSS-REFERENCE TO RELATED APPLICATIONS

This application is a continuation-in-part of my co-pending application Ser. No. 78,183, filed Oct. 5, 1970, now abandoned.

BACKGROUND OF THE INVENTION

This invention relates to a method of protecting colloidal silica aquasols against bacterial contamination.

Colloidal silica sols are widely used in such diverse compositions as adhesives, paints, textile coatings, carpet treating agents, floor waxes and coatings, catalyst compositions, and others.

It is generally well known in the art that certain silica aquasols, particularly those which contain trace elements, provide a nutrient system in which bacteria or other microorganisms, which have not been fully identified, grow; and the by-products of such growth contaminate the aquasols. In a recent investigation, twenty-one separate organisms, at levels as high as $10^8$ cfu/ml (colony forming units per milliliter), were isolated from silica aquasols. These organisms were both gram positive and negative, bacillus and coccus shaped. The contamination by the bacteria results in colored and clear slime, floating and sinking floc, product coloration ranging from off-white to black, product viscosity increases, occasionally a sulfide-like odor, as well as other effects.

Attempts have been made in the past to incorporate into colloidal silica aquasols effective bacteriostatic agents, which would prevent the above undesirable changes from occurring. A considerable success was achieved by adding to silica sols up to about 250 ppm of formaldehyde, as described in U.S. Pat. No. 3,148,110 (to McGahen). A more recent Canadian Patent (to Monsanto Co.), No. 799,440, discloses the addition of a hexamine-halohydrocarbon quaternary compound. Other prior art efforts included use of hydrogen peroxide or of sodium hypochlorite as silica sol bacteriostats.

While all such methods provided protection against microorganisms, some of them had certain undesirable features which made them impractical. Formaldehyde, for example, is volatile and can gradually escape from storage containers which are imperfectly closed. Also, formaldehyde can undergo chemical reactions that render it ineffective. Both sodium hypochlorite and hydrogen peroxide are decomposed by sunlight. Hexamine-halohydrocarbon quaternaries are relatively expensive. In addition, many potential bacteriostatic candidates are unsuitable because they are not physically compatible with colloidal silica sols. They often cause gelation of the sol; cause floc; or increase its viscosity; or impart an undesirable color or odor; or increase the turbidity. Certain candidates are stable only in certain narrow pH ranges, which may be outside of the optimum pH range for a given silica sol. Other candidates require such a large amount of chemical to be present, that the candidates then become contaminants to the product.

There is a need, therefore, for an effective antibacterial agent which would be compatible with commercial colloidal silica sols; which would control the whole spectrum of microorganisms normally encountered in such sols; and which would retain its activity for a practical period, for example, six months to one year. With respect to the last requirement mentioned above, some bactericides produce an initial kill but are ineffective against bacteria that are subsequently introduced in the silica aquasol.

SUMMARY OF THE INVENTION

According to this invention, it has now been discovered that colloidal aqueous silica sols are effectively protected against bacterial contamination by addition, with agitation, to such sols of about 10–1000 ppm (parts per million) of hexachlorophene,

DETAILED DESCRIPTION OF THE INVENTION

Hexachlorophene, the active material in the process of this invention, is also known as 2,2'-methylenebis-3,4,6-trichlorophenol; bis-(3,5,6-trichloro-2-hydroxyphenyl)methane; or 2,2'-dihydroxy-3,5,6,3',5',6'-hexachlorodiphenylmethane. It can be represented by the following formula:

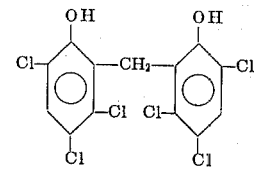

This compound is well known in the art (U.S. Pat. No. 2,250,480) and has been widely used as an antiseptic, disinfectant, or bactericide. It can be readily obtained commercially, for instance, from Sindar Corporation in New York City.

Hexachlorophene is a white, free-flowing powder, which melts at about 161°–167°C. It is soluble in acetone, alcohol, and ether but insoluble in water.

Colloidal silica sols are dispersions of 15 to 60 percent by weight discrete spherical particles of surface-hydroxylated silica in water. The silica particles are in the form of spheres. These opalescent liquids have a slight bluish cast. Commercially available aquasols normally contain from 15 to 60 weight percent $SiO_2$, whose particle size ranges from 2 to 100 m$\mu$. The pH of these aquasols usually ranges from 7.5 to 10.5, and they are generally stabilized by a small amount of sodium hydroxide.

Colloidal silica sols which can be protected in the manner contemplated by the present invention are all those colloidal silica aquasols which are normally attacked by bacteria or other microorganisms, with resulting deterioration and loss of acceptable appearance. Such colloidal silica sols are sold, for example, by the Du Pont Company under the trade name Ludox. Of the grades of Ludox sols presently available, the grades indicated as HS, LS, SM, TM, AS and AM are susceptible to bacterial attack. These silica sols are described in detail in "Du Pont Ludox Colloidal Silica Technical/Product Information," published 1969. Other commercial sols which can also be treated by the method of the invention are the "Nalcoag" silica sols sold by Nalco Chemical and the "Syton" sols sold by Monsanto.

It might appear at first that hexachlorophene could be incorporated into silica aquasols in any convenient manner, for example, as a dry powder, a solution, or a dispersion. Addition of dry powder is not practical because of the difficulty of distributing such powder homogeneously throughout the sol. In addition, it is difficult to reduce dry hexachlorophene to sufficiently small particle size which would be compatible with the sol and would not cause excessive turbidity.

A dispersion in water is not desirable since such a dispersion would have to be formulated with suspending agents, surfactants and other ingredients which could upset the physical balance of a silica sol and cause gelation or precipitation.

A hexachlorophene solution in a water-miscible solvent, such as alcohol or acetone, has two shortcomings. First, hexachlorophene reprecipitates when such a solution is added to a colloidal silica aquasol, thus increasing the turbidity and reducing the bactericidal activity; second, the organic solvent itself constituted a nutrient for some microorganisms, which then are more difficult to control in such a favorable environment. Solvents usually are also incompatible with the product and its uses since they change the physical properties of the sols, impart odor, and often are toxic.

The critical manner of adding hexachlorophene to colloidal silica aquasols consists in first dissolving hexachlorophene in an aqueous alkali, then adding the solution with good agitation to the silica aquasol, either at room temperature or above. For example, an aqueous solution containing about 4 weight percent of sodium hydroxide can dissolve a sufficient amount of hexachlorophene to give a solution containing 10 percent by weight of the latter. This is a very practical concentration because it allows effective quantities of hexachlorophene to be added to colloidal silica sols virtually without at the same time changing the pH of such sols. Still higher concentrations of hexachlorophene in 4 percent NaOH, up to about 20% can be obtained and used. It is not recommended to use solutions containing less than about 5 percent hexachlorophene because the volume of the alkaline solution which must be added for effective protection could unfavorably affect the sols.

The preferred concentration of hexachlorophene in the colloidal silica sol is about 100–200 ppm. It is not practical to use more than about 1000 ppm because the effectiveness of such larger concentrations is about the same as at the 1000 ppm level of hexachlorophene, and the additional expense would be unjustified.

Instead of aqueous sodium hydroxide any equivalent aqueous alkali can be used; however, sodium hydroxide is the preferred alkali. This can be an alkali metal hydroxide, for example, lithium hydroxide, potassium hydroxide, cesium hydroxide, or rubidium hydroxide; ammonium hydroxide, a quaternary ammonium hydroxide, such as, for example, tetramethylammonium hydroxide, tetraethylammonium hydroxide, tetrabutylammonium hydroxide; a carbonate, or a silicate of any of the above cations. The mixture is thoroughly agitated either during or after the addition of the hexachlorophene solution.

In addition the hexachlorophene-alkali solution to the silica aquasol, sufficient agitation must be provided to keep the hexachlorophene in solution. Thus, if the hexachlorophene-alkali solution is added to the silica aquasol in a tank, sufficient mechanical agitation is required to obtain a surface agitation, i.e., there must be agitation at the location where the hexachlorophene-alkali solution is added to the silica aquasol. If a pipe line mixer is used, the Reynolds number employed must be above that required for laminar flow.

Instead of dissolving hexachlorophene in an alkali and adding the alkali solution to a colloidal silica aquasol, it also is possible to first prepare the hexachlorophene salt of an alkali and to add this salt, either as such or in an aqueous solution, to a silica sol. The salt can be made, for example, by dissolving stoichiometric amounts of hexachlorophene and an alkali alkoxide in an alcohol, such as methanol or ethanol, and evaporating the alcohol.

While a 4 percent sodium hydroxide solution has been used successfully in the process of this invention to dissolve hexachlorophene, it will be readily recognized that such concentration is suggested here as only one possibility. Either less or more concentrated solutions can be used without affecting the operability of the present process. From practical standpoint, the concentration can vary within broad limits of about 1–20 weight percent of sodium hydroxide or equivalent molar concentrations of other alkalies.

This invention is now illustrated by the following representative examples of certain preferred embodiments thereof, wherein all parts, proportions, and percentages are by weight unless otherwise indicated. The following analytical methods were used:

A. The electrometric measurement of pH was obtained using a Beckman or equivalent meter equipped with a glass electrode, calomel electrode, and temperature compensator.

B. Viscosity was calculated from the time required for a definite volume of solution to flow through a calibrated capillary, using an OSWALD-FENSKE viscosity pipette, the viscosity being expressed in centipoise units.

C. Turbidity was determined directly using a Fisher Electrophotometer with a green B(525) filter, taking the absorbence reading as an arbitrary numerical evaluation.

EXAMPLE 1

Hexachlorophene was dissolved in aqueous 4 percent sodium hydroxide to form a 10 percent hexachlorophene solution. A sufficient amount of this solution was added with agitation to Ludox AM colloidal silica (E. I. du Pont de Nemours & Co., Alumina-Modified colloidal silica aquasol having a pH of 9.1, a viscosity of 14.4, 30 percent by weight silica and a particle size of 13–14 m$\mu$) to give a 200 ppm hexachlorophene concentration. To another sample of Ludox AM there has added an aqueous 10 percent formaldehyde solution to give a 200 ppm concentration. A third sample of Ludox AM was not treated with any bacteriostatic agent. Two additional types of colloidal silica aquasols were prepared in the same manner. They were Ludox SM (E. I. du Pont de Nemours & Co., colloidal silica aquasol having the average particle size of 7 m$\mu$, a pH of 10.0, a viscosity of 6.9, and having 30 percent by weight silica solids), and Ludox TM (E. I. du Pont de Nemours & Co., colloidal silica aquasol having the average particle size of 25 m$\mu$, a pH of 9.2, a viscosity of 41.7 and about 50 percent by weight silica).

The physical properties of the aquasols were compared immediately after preparation and the following results were obtained:

Ludox AM

| | Without a Bactericide | With Formaldehyde | With Hexachlorophene |
|---|---|---|---|
| pH | 9.1 | 8.8 | 8.8 |
| Viscosity | 14.4 | 14.4 | 12.5 |
| Turbidity | 10.2 | 10.2 | 11.2 |

All viscosities are at 25°C. and expressed in centipoise

Ludox SM

| | Without a Bactericide | With Formaldehyde | With Hexachlorophene |
|---|---|---|---|
| pH | 10.0 | 10.0 | 10.2 |
| Viscosity | 6.9 | 7.6 | 6.6 |
| Turbidity | 2.8 | 2.8 | 3.3 |

Ludox TM

| | Without a Bactericide | With Formaldehyde | With Hexachlorophene |
|---|---|---|---|
| pH | 9.2 | 9.2 | 9.2 |
| Viscosity | 41.7 | 44.9 | 40.8 |
| Turbidity | 42.7 | 42.7 | 47.4 |

It can be seen that hexachlorophene is physically as compatible as formaldehyde with all three types of Ludox silica sols. All these samples as well as untreated control samples were inoculated with a mixed culture of twenty-one strains of bacteria previously isolated from colloidal silica aquasols. While many of these bacteria have not been identified, the majority belonged to the following, morphologically distinct, four groups:

a. Small gram-negative, rod-shaped bacterium producing an irregular, smooth, raised, translucent spreading colony on Trypticase Soy Agar.
b. Large gram-negative, rod-shaped bacterium producing a circular, mucoid, convex, white colony on Trypticase Soy Agar.
c. Gram-negative, rod-shaped bacterium producing a circular, smooth, convex, yellow colony on Trypticase Soy Agar.
d. Gram-positive, rod-shaped bacterium producing a circular, smooth, convex, pink colony on Trypticase Soy Agar.

The samples were stored at 36.6°C. The concentrations of bacteria were determined by quantitative plating on Trypticase Soy Agar at the end of eight days and again at the end of thirteen days. The following results were obtained:

| | Material | Duration of Storage 8 Days | 13 Days |
|---|---|---|---|
| (1) | Ludox AM with 200 ppm Hexachlorophene | 10 cfu*/ml | 10 cfu/ml |
| (2) | Ludox SM with 200 ppm Hexachlorophene | 10 cfu/ml | 10 cfu/ml |
| (3) | Ludox TM with 200 ppm Formaldehyde | $1 \times 10^6$ cfu/ml | — |

*colony-forming units

The bacterial counts show that hexachlorophene is by far a more efficient bacteriostat than formaldehyde. Hexachlorophene-protected Ludox was virtually free of bacteria at the end of thirteen days, while the formaldehyde-protected Ludox had a relatively high count of bacteria. It is to be noted that a high concentration of bacteria does not necessarily mean that visible changes in the silica sol have occurred.

However, bacterial contamination of the order of $10^4$ cfu/ml or above usually indicates that undesirable changes will occur within the expected storage period.

EXAMPLE 2

A 10 percent hexachlorophene solution in an aqueous sodium hydroxide was added to Ludox AM in such an amount that a 100 ppm concentration of hexachlorophene was obtained in the silica aquasol. The aquasol was inoculated with the mixed culture of bacteria described in Example 1 to a level of $6.9 \times 10^6$ cfu/ml and stored at 36.6°C. After seven days, the bacteria count decreased to less than 10 cfu/ml, as determined by plating on Trypticase Soy Agar.

EXAMPLE 3

Hexachlorophene was dissolved in aqueous 4 percent sodium hydroxide to form a 10 percent hexachlorophene solution. A sufficient amount of this solution was added with agitation to Ludox AM colloidal silica (E. I. du Pont de Nemours & Co., Alumina-Modified colloidal silicon aquasol) to give a 200 ppm hexachlorophene concentration in the silica aquasol. To another sample of Ludox AM there was added an aqueous 10 percent formaldehyde solution to give a 200 ppm concentration. A third sample of Ludox AM was not treated with any bacteriostatic agent. A sample of each material was stored for three months at room temperature as well as at 60°C. Three-month storage at 60°C. is an accelerated physical compatibility test which, fairly well represents one year storage at room temperature. The following physical properties were determined in each case after three months.

| | Without a Bactericide | | Ludox AM With Hexachlorophene | | With Formaldehyde | |
|---|---|---|---|---|---|---|
| | Room[1] Temp. | 60°C. | Room Temp. | 60°C. | Room[2] Temp. | 60°C. |
| pH | 8.8 | 8.9 | 8.9 | 8.9 | 8.8 | 8.8 |
| Viscosity | 14.8 | 12.5 | 12.5 | 9.7 | 12.2 | 7.4 |
| Turbidity | 13.4 | 9.8 | 14.9 | 14.9 | 13.4 | 10.7 |

[1] These samples had developed an objectionable odor, dark color, and slime;
[2] These samples had developed some odor, color, and slime.

The above results show that hexachlorophene is physically compatible with Ludox AM in that neither the pH nor the viscosity or turbidity of the silica sol are substantially changed on storage. Hexachlorophene also prevents the appearance of such undesirable features as color, odor, or slime formation. Formaldehyde, a prior art bacteriostat, was also physically compatible with Ludox AM but did not provide as good protection against undesirable changes in the sol.

We claim:

1. A method of protecting a colloidal silica aquasol from undesirable bacteria, said method comprising adding to said aquasol about 10–1000 parts per million, by weight, of hexachlorophene dissolved in an aqueous solution of an alkali selected from the group consisting of:

alkali metal hydroxides, ammonium hydroxide, quaternary ammonium hydroxides, alkali metal carbonates, quaternary ammonium carbonates, alkali metal silicates, and quaternary ammonium silicates and providing sufficient agitation to keep the hexachlorophene alkali in solution in said aquasol.

2. The method of claim 1 wherein the alkali is sodium hydroxide.

3. The method of claim 1 wherein the hexachlorophene solution is prepared by dissolving about 5–20 weight percent of hexachlorophene in a 1–20 weight percent aqueous sodium hydroxide solution.

4. The method of claim 1 wherein the colloidal silica aquasol contains about 15–60 weight percent of silica, said silica having particle diameters within the range of 2–100 millimicrons.

5. A method of protecting a colloidal silica aquasol from undesirable bacteria, said method comprising adding to said aquasol about 10–1000 parts per million, by weight, of hexachlorophene in the form of hexachlorophene salt of an alkali metal and providing sufficient agitation to keep the hexachlorophene salt in solution in said aquasol.

6. The method of claim 5 wherein the hexachlorophene salt is added as a solution in water.

7. The method of claim 5 wherein the hexachlorophene salt is the sodium salt.

* * * * *